United States Patent
Boutaris et al.

(10) Patent No.: US 8,398,131 B2
(45) Date of Patent: Mar. 19, 2013

(54) RADIATOR GRILL ARRANGEMENT

(75) Inventors: Konstantin Boutaris, Ammerbuch (DE); Renato Ferrera, Grafenau (DE); Martin Konermann, Stuttgart (DE)

(73) Assignee: Daimler AG, Suttgart (DE)

( * ) Notice: Subject to any disclaimer, the term of this patent is extended or adjusted under 35 U.S.C. 154(b) by 39 days.

(21) Appl. No.: 13/061,891

(22) PCT Filed: Sep. 24, 2009

(86) PCT No.: PCT/EP2009/006897
§ 371 (c)(1),
(2), (4) Date: Mar. 2, 2011

(87) PCT Pub. No.: WO2010/034489
PCT Pub. Date: Apr. 1, 2010

(65) Prior Publication Data
US 2011/0187153 A1    Aug. 4, 2011

(30) Foreign Application Priority Data
Sep. 27, 2008  (DE) .......................... 10 2008 049 228

(51) Int. Cl.
*B60R 19/52*    (2006.01)

(52) U.S. Cl. .................. 293/115; 180/68.1; 296/193.1; 123/41.04

(58) Field of Classification Search ................ 296/193.1; 293/115; 180/68.1; 123/41.04
See application file for complete search history.

(56) References Cited

U.S. PATENT DOCUMENTS

| | | | | |
|---|---|---|---|---|
| 1,393,917 A | * | 10/1921 | Snell | 165/98 |
| 1,643,192 A | | 9/1927 | Yeager | |
| 3,115,223 A | | 12/1963 | Shustrom | |
| 3,759,056 A | * | 9/1973 | Graber | 62/183 |
| 4,064,934 A | * | 12/1977 | Kolthoff et al. | 165/97 |
| 6,966,596 B1 | * | 11/2005 | Rinehart | 296/57.1 |
| 2007/0227794 A1 | | 10/2007 | Diehl | |
| 2008/0073920 A1 | | 3/2008 | Knauer | |

FOREIGN PATENT DOCUMENTS

| | | |
|---|---|---|
| DE | 39 05 717 A1 | 8/1990 |
| DE | 91 06 188.1 U1 | 10/1991 |
| DE | 199 37 153 A1 | 3/2001 |

(Continued)

OTHER PUBLICATIONS

German Office Action dated Dec. 16, 2010 (three (3) pages).

(Continued)

*Primary Examiner* — Joseph Pape
(74) *Attorney, Agent, or Firm* — Crowell & Moring LLP

(57) ABSTRACT

A radiator grill arrangement for a motor vehicle front end of a motor vehicle with a number of air passage openings, which can be closed at least substantially by at least one flap element is provided. The at least one flap element is supported so as to be able to swivel about an associated flap axis. In driving states of the motor vehicle in which little cooling air is needed for the engine or engine compartment, the entire flap arrangement or a part of the flaps can thus be closed in order to improve the drag coefficient $c_w$ of the motor vehicle and to save fuel. Also in the parked state of the motor vehicle with the engine switched off, it is possible to close the flap arrangement in order to ensure a more aesthetically pleasing appearance of the motor vehicle.

11 Claims, 5 Drawing Sheets

FOREIGN PATENT DOCUMENTS

Figure 1:
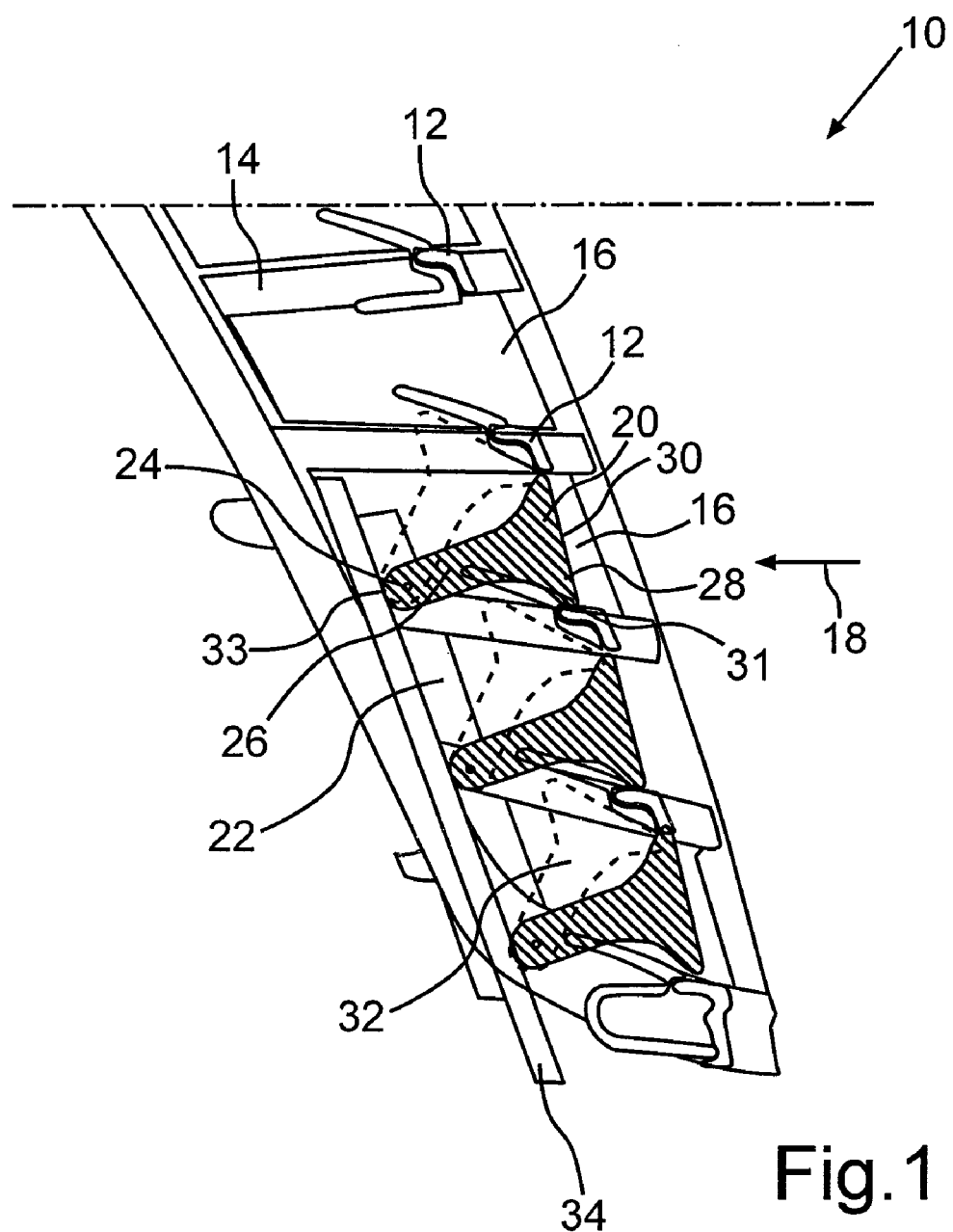

| | | |
|---|---|---|
| DE | 10 2004 048 038 A1 | 4/2006 |
| DE | 10 2006 016 880 A1 | 10/2007 |
| EP | 0 605 325 A1 | 7/1994 |
| FR | 2 404 557 A | 4/1979 |
| GB | 240292 A | 10/1925 |
| GB | 2 131 150 A | 6/1984 |

OTHER PUBLICATIONS

International Search Report with partial English translation dated Dec. 21, 2009 (eight (8) pages).
Form PCT/ISA/237 (six (6) pages).

* cited by examiner

| Actuation Element | Gearing | At Least One Flap Element |

Fig. 5a

| Actuation Element | Worm Gearing | At Least One Flap Element |

Fig. 5b

| Actuation Element | Friction Fit | At Least One Flap Element |

Fig. 5c

RADIATOR GRILL ARRANGEMENT

CROSS REFERENCE TO RELATED APPLICATIONS

The present application is a national stage of PCT International Application No. PCT/EP2009/006897, filed Sep. 24, 2009, and claims priority under 35 U.S.C. §119 to German Patent Application No. 10 2008 049 228.0, filed Sep. 27, 2008, the entire disclosures of these documents are herein expressly incorporated by reference.

BACKGROUND AND SUMMARY OF THE INVENTION

The invention relates to a radiator grill arrangement for a motor vehicle front end of a motor vehicle.

These radiator grill arrangements with closeable air passage openings are known from the state of the art. DE 10 2004 048 038 A1 discloses a closeable motor vehicle radiator grill arrangement, where closing of the air passage openings in the radiator grill is realized by a displaceable bar element structure. These devices require a relatively large installation space in order to enable the translational movement of the bar elements from a closing into an opening position. This is not desirable with modern engine chambers, which are already cramped.

Accordingly, exemplary embodiments of the present invention are directed to a radiator grill arrangement for a motor vehicle front end of a motor vehicle in which an opening and closing of air passage openings in the radiator grill is enabled with a low installation space and simple kinematics.

This is achieved solved by a radiator grill arrangement for a motor vehicle front end of a motor vehicle, the radiator grill arrangement comprising a radiator grill with a plurality of air passage openings, and at least one flap element of a flap arrangement, the flap arrangement being connected to the radiator grill in a manner such that one or several of the air passage openings can be substantially closed, wherein the at least one flap element is swivelably supported around an associated rotational axis.

A generic radiator grill arrangement for a motor vehicle front end of a motor vehicle includes a radiator grill comprising a plurality of air passage openings, and at least one flap element of a flap arrangement, by means of which one or several air passage openings can be closed at least substantially. It is provided according to the invention that the at least one flap element is mounted in a swiveling manner around an associated flap axis. A swiveling of the flap elements in order to influence an opening state of the air passage openings in such a manner is distinguished by a low installation space requirement and by a simple kinematics. The radiator grill according to the invention can thus be realized in a space-saving and cost-efficient manner and ha additionally a low maintenance requirement due to the simple movement kinematics.

In a preferred embodiment of the invention, the at least one flap element can be swiveled between a closing position, in which it closes at least one associated air passage opening, and an opening position, in which it completely unblocks the at least one associated air passage opening. A regulation of the air flow flowing through the radiator grill will thus be possible by such an arrangement. This air flow serves for the cooling of the engine compartment and of components arranged therein. In certain operating states, a partial closing of the radiator grill arrangement can be advantageous, as more air than actually necessary for the cooling is supplied to the engine compartment by means of the driving wind. By means of a partial or complete closing of the radiator grill arrangement, the air supply to the engine compartment is reduced to the required air in these driving states and the drag coefficient $c_w$ is thereby simultaneously improved. Additional fuel savings are result thereby. The emission of sound from the engine compartment is also reduced with a closed radiator grill arrangement.

In a further preferred embodiment, in the closing position of the at least one movable flap element, an edge thereof engages a groove of an associated bar or the like limiting at least one air passage opening of the radiator grill arrangement. Thereby, the flap element is additionally fixed mechanically in its closing position and a particularly tight closure of the air passage opening is achieved is achieved by the cooperation between the edge and the groove.

In order to further improve the sealing action of the flap elements in their closing position, a further embodiment involves mounting a sealing element at the edge of the flap element and/or at the groove, into which the mentioned edge engages. This can, for example, be realized in the form of a sealing lip of rubber or the like. This improves the sealing action and further reduces the sound emission from the engine compartment. In a particularly preferred embodiment, the edge and the groove form a labyrinth seal in the closing state of the flap elements. The sealing action is hereby improved further.

A further aspect of the invention relates to the formation of the at least one flap element. This preferably comprises a closing surface, which covers the associated air passage opening in the closing position, and a base part. The base part can thereby be formed smaller and lighter than the region of the closing surface, so that weight and further installation space are saved. The rotational axis of the at least one flap element is preferably arranged in the region of the mentioned base part.

In a further arrangement of the invention, an actuation element is provided which is coupled to an end region of the at least one flap element. It is thereby particularly preferred to couple the actuation element to an end region of the base part. A particularly simple movement kinematics of the flap element results. A movement of the actuation element is transferred to the flap element via the end region of the base part, which can rotate around its rotational axis in the manner of a lever and thereby changes the closing state of the associated air passage opening. By means of the distances between the end region and the rotational axis on the one hand and the rotational axis and the closing surface on the other hand, one can adjust in which ratio movements of the actuation element are transferred to movements of the flap element. Particularly, a short distance from the end region to the rotational axis in connection with a long distance from the rotational axis to the closing surface enables a very space-saving realization of such a radiator grill arrangement. With such a distance ratio between the mentioned points, very small movements of the actuation element are sufficient to swivel the closing surface over a wide path. Such an arrangement additionally enables a fast adjustment of the flap elements.

The actuation element is formed in the shape of a push rod or a torsion rod in a further preferred embodiment. The actuation element itself only requires very little installation space for its movement in these embodiments, as only a small translational movement is necessary with the arrangement in the form of a push rod, in order to achieve the desired movement of the flap elements. The design as a torsion rod is even more space-saving, as the actuation element only has to carry out internal movements in this form without moving in the space relative to other components which are arranged in the engine compartment. The transfer of the movement of the actuation element to the flap elements thereby preferably takes place via a gearing, a worm gearing or a friction fit. The type of the coupling between actuation element and flap elements is thereby substantially dependent on the type of the movement of the actuation element. A push rod could, for example, be designed in the form of a gear rod, which cogs with a complementary gearing of the flap elements. In the case of a torsion rod, it lends itself to use a worm gearing, so that a rotation of the torsion rod can be converted into the corresponding movement of the flap elements via a cogging gearing of the flap elements.

For driving the actuation element, an electrical or pneumatic drive is advantageously provided. This can possibly be connected with a control device, so that the position of the flap elements can be adapted automatically in dependence on an engine compartment temperature, engine temperature or also a driving speed.

In a further particularly preferred embodiment, exactly one movable flap element is further associated with each air passage opening. These flap elements can possibly also be subject to a separate control, so that respectively only a part of the air passage openings is closed or opened in certain driving states in dependence on the cooling air requirement and on the driving speed. A further optimization of the cooling air flow in connection with an optimization of the air drag coefficient $c_w$ of the motor vehicle and thus of the fuel usage is thereby possible.

BRIEF DESCRIPTION OF THE DRAWING FIGURES

Figure 2:
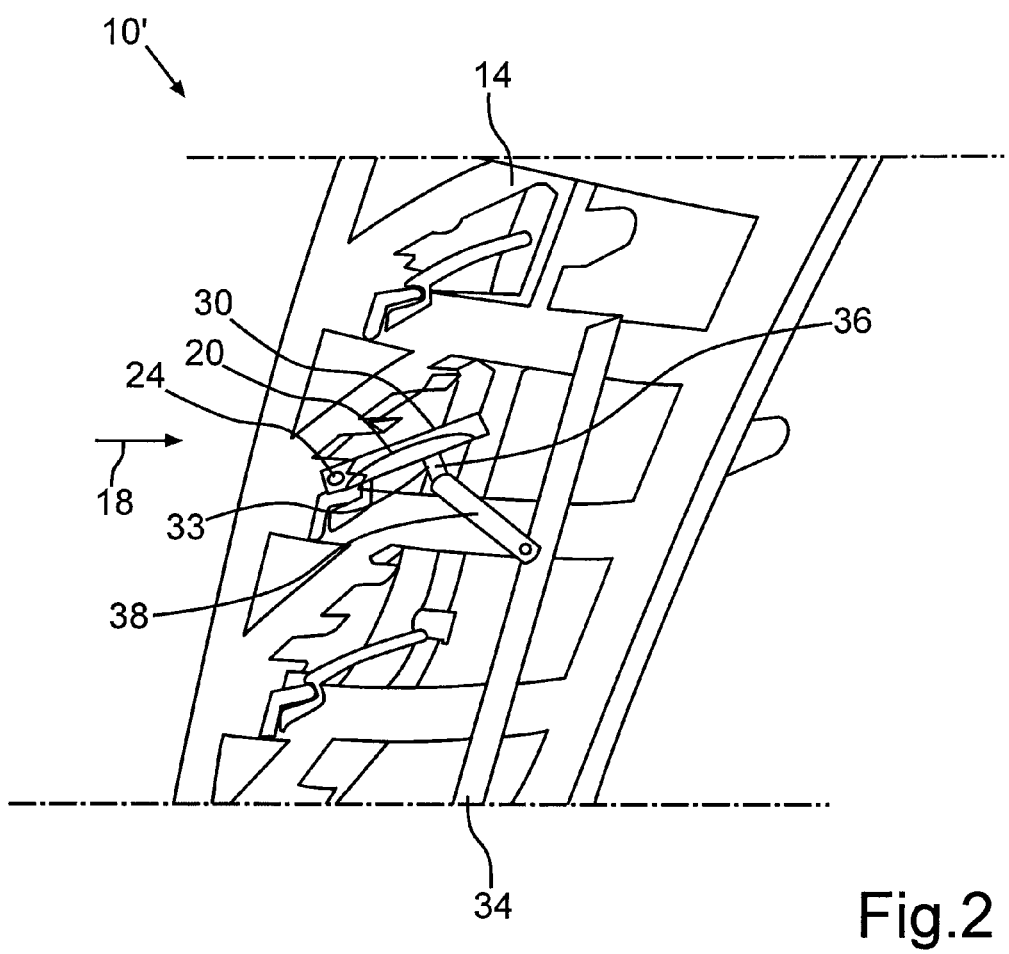
Figure 3:
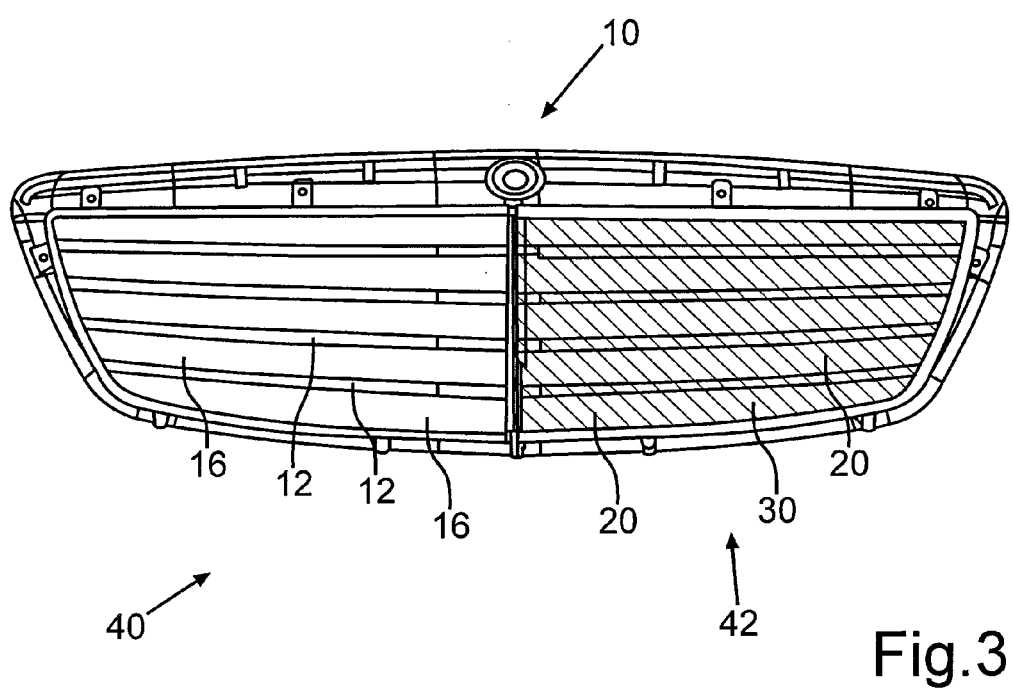

The invention and its embodiments shall be explained in more detail in the following by means of the drawings. It shows hereby:

FIG. 1 a schematic sectional depiction through an embodiment of a radiator grill arrangement according to the invention, FIG. 2 a schematic sectional depiction through an alternative embodiment of a radiator grill arrangement according to the invention, FIG. 3 a front view of an embodiment of a radiator grill arrangement according to the invention.

Figure 4A:
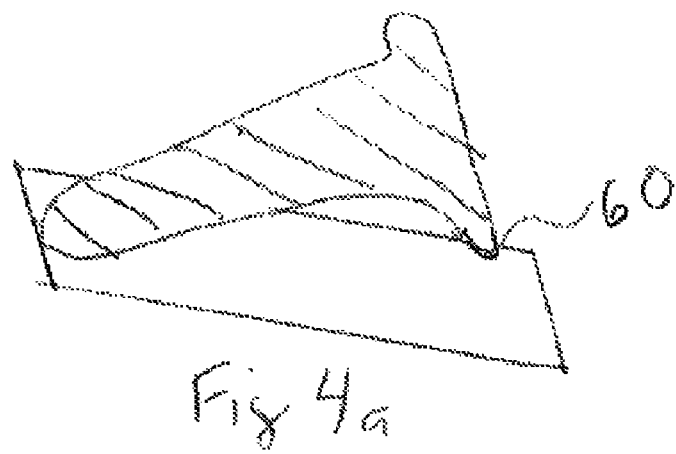
Figure 4B:
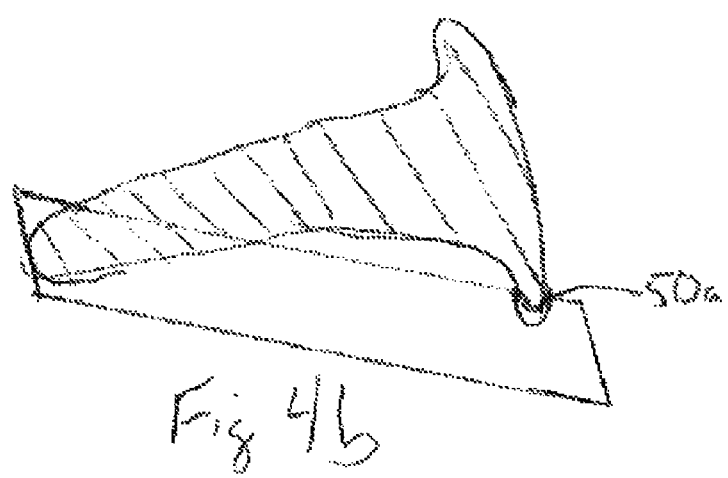
Figure 4C:
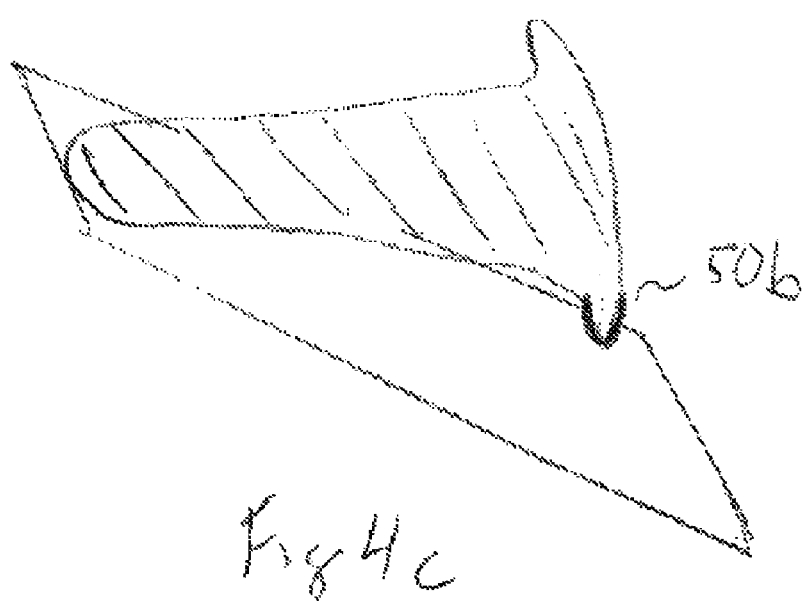

FIGS. 4*a*-4*c* schematic sectional depictions through a portion of a radiator grill arrangement according to the invention, and FIGS. 5*a*-5*c* schematic depictions of gearing, worm gearing, and friction fit.

DETAILED DESCRIPTION OF THE INVENTION

The radiator grill arrangement shown in FIG. 1, altogether designated as 10, comprises a plurality of fins 12, which are not all marked for a clear view and which are also described herein as bars 12. The fins 12 are mounted on a rigid bar structure 14 and extend in the transverse vehicle direction. Air passage openings 16 are formed between the fins 12, through which driving wind can enter the engine compartment from the vehicle front in the direction of the arrow 18. In order to be able to close the air passage openings 16 with a low cooling air requirement or during the standstill state of the vehicle with a switched-off engine, flaps 20 that can be swiveled are provided. These are mounted in a swiveling manner at lateral side ribs 22 of the bar structure 14 around a rotational axis 24.

The flaps 20 comprise a base part 26, which carries the rotational axis 24 and a top part 28, at which a closing surface 30 is formed.

The flaps 20 depicted with solid contours are in their closed state in FIG. 1, in which they close the air passage openings 16. As illustrated in FIG. 4*a*, in order to further improve the closing action of the flaps 20, a front edge 31 of the flaps 20 can engage an associated groove 60 of the bars 12 in the closed state of the flaps 20. Additionally, sealing elements can thereby be arranged at the flaps 20 or bars 12 either in the region of the groove (see sealing element 50*a* of FIG. 4*b*) or in the regions of the front edges 31 (see sealing element 50*b* of FIG. 4*c*), in order to prevent a passage of air through the closed flaps 20 in a manner that is efficiently as possible. As illustrated in FIG. 4*c*, by means of the immersion of the front edges 31 of the flaps 20 into associated grooves of the bars, a seal in the form of a labyrinth seal thus results, which prevents the air passage through the radiator grill arrangement 10 with closed flaps 20 in a particularly efficient manner. The opened state 32 of the flaps 20 is shown alongside thereof with a dashed contour line, in which they are swiveled upwards, whereby the closing surface 30 unblocks the air passage openings 16.

In order to move the flaps 20 between their opening and closing state, an actuation device in the form of a push rod 34 is provided. This enters an operative connection with the end region 33 of the base part 26 of the flaps 20, so that the flaps 20 can rotate around the rotational axis 24 during a displacement of the push rod and thus can be displaced between their opening and closing state.

In addition to a regulation of the air amount flowing into the engine compartment, the drag coefficient $c_w$ of the associated motor vehicle can be reduced by closing the flaps when the cooling air requirement is low.

Individual flaps 20 can be designed in an individually controllable manner, so that only a part of the flow surface of the radiator grill arrangement can be opened with a corresponding air requirement. This can be particularly sensible with high driving speeds, as a high retention pressure is present due to the high speed, and only a low air passage surface is needed through the radiator grill arrangement in order to supply the engine compartment with cooling air. It is thereby possible to keep a large part of the flaps 20 closed, which reduces the drag coefficient $c_w$. This is especially important with high driving speeds, as considerable fuel amounts can be saved.

FIG. 2 shows an alternative embodiment of a radiator grill arrangement 10', wherein the coupling between the push rod 34 and the flaps 20 does not take place directly, as shown in FIG. 1, but indirectly via a joint rod 38 mounted in a movable manner at the push rod 34 and also at a bar 36 of the flap 20. These flap arrangements can be arranged in a more installation saving manner, or can be adapted better to geometric requirements in the installation region via the design of the joint rod 38, so that other constructive measures possibly do not have to be taken in order to create space for the push rod 34. In the illustrated embodiment, the flaps 20 themselves do not have a pronounced separation in the closing surface 30 and the base part 22. Rather, they consist of a basic body formed in an areal manner, which only comprises a short bar 36 instead of the base part 26. In a functional manner, the flaps 20 however correspond to those shown in FIG. 1. Further substantial differences to the radiator grill arrangement 10 shown in FIG. 1 do not exist. An electrical or pneumatic drive can serve for the drive of the push rod, wherein a connection with pneumatic systems that already exist is possible with pneumatic drives without further ado.

FIG. 3 shows a front view of a radiator grill arrangement 10 according to the invention, wherein the left half 40 is depicted with opened air passage openings 16, that is, with flaps in their open position, and the right half 42 with closed air passage openings 16, that is, the flaps in their closed position. The closing position shown on the right can be adjusted automatically when the vehicle is parked and the engine is switched off. By the corresponding design of the closure surfaces 30, which point outward in this case, an aesthetically pleasing appearance of the parked motor vehicle can be achieved.

FIGS. 5a-5c respectively illustrate the transfer of the movement of the actuation element to the flap elements via a gearing, a worm gearing or a friction fit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A radiator grill arrangement for a motor vehicle front end of a motor vehicle, the radiator grill arrangement comprising:
   a radiator grill with a plurality of air passage openings delimited by a plurality of bars; and
   at least one flap element of a flap arrangement, the flap arrangement being connected to the radiator grill in a manner such that one or several of the air passage openings can be substantially closed and the at least one flap element being associated with one of the plurality of bars,
   wherein the at least one flap element is swivelably supported around an associated rotational axis,
   wherein the at least one flap element is swivelable between a closing position, in which it closes at least one associated air passage opening, and an opening position, in which it completely unblocks the at least one associated air passage opening,
   wherein an edge of the at least one movable flap element engages a groove of the associated bar, and
   wherein a sealing element is provided at the edge or the groove.

2. The radiator grill arrangement according to claim 1, wherein the edge and the groove form a labyrinth seal.

3. The radiator grill arrangement according to claim 1, wherein the at least one flap element comprises a base part and a closing surface, the closing surface covering a corresponding air passage opening in the closing position.

4. The radiator grill arrangement according to claim 3, wherein the associated rotational axis of the at least one flap element is arranged in a region of the base part.

5. The radiator grill arrangement according to claim 1, further comprising:
   an actuation element coupled to an end region of the at least one flap element.

6. The radiator grill arrangement according to claim 3, wherein the associated rotational axis of the at least one flap element is arranged in the region of the base part, the arrangement further comprising:
   an actuation element coupled to an end region of the at least one flap element and to an end region of the base part.

7. The radiator grill arrangement according to claim 6, wherein the actuation element is a push rod or a torsion rod.

8. The radiator grill arrangement according to claim 7, wherein the actuation element is coupled to the at least one flap element via a gearing, a worm gearing or a friction fit.

9. The radiator grill arrangement according to claim 5, further comprising:
   an electrical or pneumatic drive coupled to drive the actuation element.

10. The radiator grill arrangement according to claim 1, wherein exactly one movable flap element is associated with each air passage opening.

11. The radiator grill arrangement according to 1, further comprising:
   an actuation element; and
   a joint rod coupled to the actuation element and to the at least one flap element.

* * * * *